United States Patent
Shin et al.

(10) Patent No.: US 10,347,908 B2
(45) Date of Patent: Jul. 9, 2019

(54) LITHIUM ION SECONDARY BATTERY AND MANUFACTURING METHOD OF THE LITHIUM ION SECONDARY BATTERY

(71) Applicant: HITACHI, LTD., Tokyo (JP)

(72) Inventors: Seogchul Shin, Tokyo (JP); Naoki Kimura, Tokyo (JP); Eiji Seki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 756 days.

(21) Appl. No.: 14/951,724

(22) Filed: Nov. 25, 2015

(65) Prior Publication Data
US 2016/0156025 A1 Jun. 2, 2016

(30) Foreign Application Priority Data
Nov. 27, 2014 (JP) .................. 2014-239948

(51) Int. Cl.
*H01M 4/36* (2006.01)
*H01M 4/587* (2010.01)
(Continued)

(52) U.S. Cl.
CPC ............ *H01M 4/364* (2013.01); *H01M 4/13* (2013.01); *H01M 4/386* (2013.01); *H01M 4/483* (2013.01); *H01M 4/587* (2013.01); *H01M 4/622* (2013.01); *H01M 4/661* (2013.01); *H01M 10/0525* (2013.01)

(58) Field of Classification Search
None
See application file for complete search history.

(56) References Cited

U.S. PATENT DOCUMENTS 6,235,427 B1 5/2001 Idota et al.
9,774,039 B2 * 9/2017 Yamamoto .............. H01M 4/13
(Continued)

FOREIGN PATENT DOCUMENTS

JP 2005-293943 A 10/2005
JP 2006-253126 A 9/2006
(Continued)

OTHER PUBLICATIONS

English translation of JP 2006-253126 Obtained from Google Patents Oct. 30, 2018 (Year: 2018).*
(Continued)

*Primary Examiner* — Sarah A. Slifka
(74) *Attorney, Agent, or Firm* — Volpe and Koenig, P.C.

(57) ABSTRACT

A lithium ion secondary battery having a negative electrode includes a negative electrode active material containing at least one of two material of silicon and a silicon compound and carbon, a weight mixing ratio of at least one of two material of the silicon and the silicon compound and the carbon is 20:80 to 50:50, when $D_{90}$ of particles of at least one of two material of the silicon and the silicon compound is x, $D_{50}$ of particles of the carbon is y, and the weight mixing ratio of the carbon is z, $y \leq -1.17x + 0.45z$ is satisfied, the x is between 2 μm and 10 μm, the y is between 10 μm and 23 μm, and the z is between 50% and 80% by weight, and a coefficient of expansion when the negative electrode is fully charged is 110% or more and 140% or less.

5 Claims, 7 Drawing Sheets

(51) Int. Cl.
*H01M 4/38* (2006.01)
*H01M 4/66* (2006.01)
*H01M 4/62* (2006.01)
*H01M 4/13* (2010.01)
*H01M 4/48* (2010.01)
*H01M 10/0525* (2010.01)

(56) References Cited

U.S. PATENT DOCUMENTS

| | | |
|---|---|---|
| 2014/0227600 A1 | 8/2014 | Kachi |
| 2014/0234705 A1 | 8/2014 | Yayamoto et al. |
| 2014/0308588 A1 | 10/2014 | Hirakawa et al. |

FOREIGN PATENT DOCUMENTS

| | | |
|---|---|---|
| JP | 2009-187939 A | 8/2009 |
| JP | 2010-108944 A | 5/2010 |
| JP | 2013-101921 A | 5/2013 |
| KR | 10-2014-0070416 A | 6/2014 |
| KR | 10-2014-0108380 A | 9/2014 |
| WO | 2013/027686 A1 | 2/2013 |
| WO | 2013/054481 A1 | 4/2013 |
| WO | 2013/054500 A1 | 4/2013 |
| WO | 2013/069197 A1 | 5/2013 |

OTHER PUBLICATIONS

Japanese Office Action dated May 8, 2018 for the Japanese Patent Application No. 2014-239948.

* cited by examiner

LITHIUM ION SECONDARY BATTERY AND MANUFACTURING METHOD OF THE LITHIUM ION SECONDARY BATTERY

CLAIM OF PRIORITY

The present application claims priority from Japanese Patent Application JP 2014-239948 filed on Nov. 27, 2014, the content of which is hereby incorporated by reference into this application.

BACKGROUND OF THE INVENTION

1. Field of the Invention

The present invention relates to a lithium ion secondary battery and a manufacturing method of the lithium ion secondary battery.

2. Description of the Related Art

The lithium ion secondary battery has a high energy density when compared with a nickel hydrogen battery and the like and is used, for example, as a power supply of mobile electronic devices. In recent years, the scope of application thereof is further increased to medium- to large-size uses such as an on-vehicle power supply of hybrid electric vehicles and electric vehicles, a stationary uninterruptible power supply, and a power smoothing power supply. For example, electric vehicles are demanded to achieve a longer traveling distance and to meet such a demand, still higher energy densities (higher capacities) of lithium ion secondary batteries are desired.

In recent years, a lithium ion secondary battery using a silicon (Si) alloy as a negative electrode active material is expected. The Si alloy is in a state in which fine particles of the metal silicon (Si) are dispersed in each particle of other metal elements or other metal elements are dispersed in each particle of Si. The other metal elements include at least one of aluminum (Al), nickel (Ni), copper (Cu), iron (Fe), titanium (Ti), and manganese (Mn). The service capacity of the Si alloy extremely higher than that of graphite, but the coefficient of cubic expansion when fully charged is about 200 to 300% and if no countermeasure is taken against this cubic expansion, the electrode may collapse and drop off with cycles and in addition to decreased capacities, the battery may be expanded and made unusable as a battery. Thus, how to limit the expansion is a big challenge to apply the Si alloy to the negative electrode.

As a technology to limit the expansion of the negative electrode, for example, JP-2005-293943-A discloses a nonaqueous electrolyte secondary battery including a negative electrode mixture layer containing composite particles made of a metal or a compound thereof capable of occluding and releasing lithium and an electron conducting material and characterized by $0.5 < D_{50}/T < 1$ when the particle size $D_{50}$ (μm) of the composite particle in the total number 50% integrated in ascending order of particle size in an integrated distribution curve is set as the thickness T (μm) on one side of the negative electrode mixture layer. According to JP-2005-293943-A, the composite particle size containing the negative electrode active material is relatively large with respect to the thickness of the negative electrode mixture layer and the number of composite particles contained per unit volume of the negative electrode mixture layer can be decreased and, as a result, even if the volume of composite particles changes with charge and discharge cycles, the number of poor connection locations between composite particles and between composite particles and conductive agents is small and thus, a nonaqueous electrolyte secondary battery with a small expansion can be obtained.

JP-2006-253126-A discloses a negative electrode active material for a nonaqueous electrolyte secondary battery capable of electrochemically occluding and releasing Li, wherein an alloy material containing Si and at least one of Ti and Zr and a graphite material are included and the surface of the graphite material is covered with the alloy material. According to JP-2006-253126-A, the degradation of battery characteristics with the expansion of alloy material can be inhibited in a negative electrode using both the alloy material and the graphite material and therefore, a high-capacity nonaqueous electrolyte secondary battery with superior cycle characteristics can be realized.

JP-2010-108944-A discloses a nonaqueous secondary battery including a positive electrode, a negative electrode, and a nonaqueous electrolyte, wherein the positive electrode contains a lithium containing transition metal oxide, the negative electrode contains a compound containing Si atoms into/from which lithium can be inserted/released and further, the coefficient of expansion is accompanying lithium insertion of the negative electrode is 1.05 or more and 3.0 or less and the average particle size of the Si compound is 0.001 to 5 μm. According to JP-2010-108944-A, by using a Si compound of "ultrafine particles", the coefficient of expansion of the negative electrode is made smaller and the cycle life is further improved.

WO-2013/027686-A discloses a manufacturing method of a composite active material for a lithium secondary battery, including a mixing step of obtaining a mixture by mixing graphite whose specific surface area is 30 m²/g or more and a battery active material capable of combining with lithium ions and a spheroidizing step of manufacturing a composite active material for a lithium secondary battery in a substantially spherical shape containing a battery active material capable of combining with graphite and lithium ions by providing spheroidization treatment to the mixture. According to WO-2013/027686-A, the contact frequency and adhesiveness between graphite and the battery active material are good and as a result, high electrical conductivity is provided to the battery active material and the loss of conductive path due to a particle collapse of the battery active material with charge and discharge cycles can be avoided and as a result, high cycle characteristics of a lithium secondary battery can be realized.

WO-2013/069197-A discloses a negative electrode material for a lithium ion secondary battery capable of occluding and releasing lithium ions and containing negative electrode active material particles made of an element capable of an alloying reaction with lithium and/or an element compound capable of an alloying reaction with lithium, wherein 85% or more by volume of the negative electrode active material particles have the particle size of 1 μm or more when the whole particles are set as 100% by volume, the BET specific surface area is 6 m²/g or less, and $D_{50}$ of the negative electrode active material particles is 4.5 μm or more. Negative electrode active material particles made of the Si phase and the $SiO_2$ phase might as well be formed by the $SiO_2$ phase of negative electrode active material particles being made of $SiO_2$ to absorb the expansion/contraction of the Si phase and the Si phase being coated with the $SiO_2$ phase and one particle, that is, a negative electrode active material particle might as well be formed by a plurality of fine Si phases being coated with the $SiO_2$ phase and integrated and in such a case, the volume change of whole negative electrode active material particles can effectively be inhibited.

WO-2013/054481-A discloses a lithium ion secondary battery including a positive electrode and a negative electrode having a negative electrode active material containing $SiO_x$ (0.5≤x≤1.5) and graphite, wherein the compounding ratio of $SiO_x$ is 27% to 51% by weight when the $SiO_x$ and the graphite are set as 100% by weight. According to WO-2013/054481-A, $SiO_x$ powder is arranged in voids formed by graphite powder and even if the $SiO_x$ powder expands, the $SiO_x$ powder and the graphite powder are rearranged so as not to expand in the thickness direction and therefore, even if the $SiO_x$ powder expands, the volume change in the thickness direction of the negative electrode is inhibited.

WO-2013/101921-A discloses a negative electrode for a lithium ion secondary battery including a current collector and an active material layer formed on the surface of the current collector, wherein the active material layer contains an active material, a binder, and a cushioning medium, the active material is made of $SiO_x$ (0.5≤x≤1.5) powder, the cushioning medium is made of graphite powder, $D_{50}$ of the $SiO_x$ powder is ¼ to ½ of $D_{50}$ of the graphite, the compounded quantity of the graphite powder is 36% to 61% by weight when the total of the weight of the graphite powder and that of the $SiO_x$ powder is set as 100% by weight, and the content of the binder is 5% to 25% by weight when the weight of the whole active material layer is set as 100% by weight. According to WO-2013/101921-A, a lithium ion secondary battery capable of inhibiting volume changes of the negative electrode can be developed.

SUMMARY OF THE INVENTION

JP-2005-293943-A discusses only composite fine particles of silicon oxide (SiO) and carbon (C) as the negative electrode active material and no discussion is made of pure Si and an Si alloy. Pure Si and the Si alloy have a coefficient of cubic expansion larger than or comparable to that of SiO and thus, a technology that can be applied to the pure Si and the Si alloy to inhibit the expansion of the negative electrode is needed.

JP-2006-253126-A describes a negative electrode active material for a nonaqueous electrolyte secondary battery in which the surface of graphite is coated with an alloy material containing at least one of Ti and Zr, and Si. However, Si alloy coated graphite as used in JP-2006-253126-A needs a coating step and improvements in terms of the manufacturing process and costs are to be desired. Also, a high energy density cannot be obtained because the percentage of voids is very high with 40 to 45%. If voids are so numerous that a high energy density cannot be obtained, the expansion is naturally inhibited.

JP-2010-108944-A discusses a mixture of an Si compound (ultrafine particles) whose average particle size is 0.001 to 5 μm and graphite as the negative electrode material (negative electrode active material), but no discussion is made of the particle size of Si or the Si compound, the particle size of graphite, and the relationship between the weight mixing ratio and the coefficient of expansion of graphite.

WO-2013/069197-A requires the spheroidizing step of granulating a mixture of an Si compound and graphite in a spherical shape after setting the specific surface area of graphite to 30 m²/g or more and improvements in terms of the manufacturing process and costs are to be desired.

In WO-2013/027686-A, the particle size distribution of negative electrode active material particles (SiO powder) and the BET specific surface area are controlled, but no discussion is made of the particle size of Si or the Si compound, the particle size of graphite, and the relationship between the weight mixing ratio and the coefficient of expansion of graphite.

Also in WO-2013/054481-A and JP-2013-101921-A, like in JP-2005-293943-A, $SiO_x$ is discussed as the Si compound and neither Si nor Si compound is discussed. Pure Si and the Si alloy have a coefficient of cubic expansion larger than or comparable to that of SiO and thus, a technology to inhibit the expansion of the negative electrode is needed. Also, WO-2013/054481-A describes that $SiO_x$ powder is arranged in voids formed by graphite powder and even if the $SiO_x$ powder expands, the $SiO_x$ powder and the graphite powder are shifted in the width direction and rearranged so that the thickness of the negative electrode does not increase, but the inhibition of expansion in the width direction is not taken into consideration and the expansion of a battery may not be sufficiently inhibited. To inhibit the expansion of a battery, it is necessary to inhibit the expansion not only in the thickness direction of a battery, but also in the width direction thereof.

In view of the above circumstances, an object of the present invention is to provide a lithium ion secondary battery using a negative electrode active material containing silicon or a silicon compound and capable of achieving a high energy density by inhibiting the expansion of the battery and a manufacturing method thereof.

To achieve the above object, an aspect of the present invention provides a lithium ion secondary battery having a positive electrode capable of occluding and releasing lithium, a negative electrode capable of occluding and releasing the lithium, a separator separating the positive electrode and the negative electrode, and an electrolyte, wherein the negative electrode includes a negative electrode active material containing at least one of two material of silicon and a silicon compound and carbon, a weight mixing ratio of at least one of the silicon and the silicon compound and the carbon is 20:80 to 50:50, when $D_{90}$ of particles of at least one of the silicon and the silicon compound is x, $D_{50}$ of particles of the carbon is y, and the weight mixing ratio of the carbon is z, the x, the y, and the z satisfy y≤−1.17x+ 0.45z, the x is 2 μm or more and 10 μm or less, the y is 10 μm or more and 23 μm or less, and the z is 50% by weight or more and 80% by weight or less, and a coefficient of expansion when the negative electrode is fully charged is 110% or more and 140% or less.

An aspect of the present invention also provides a manufacturing method of a lithium ion secondary battery containing at least one of silicon and a silicon compound, and carbon including a particle size adjusting step of adjusting $D_{90}$ of particles of at least one of the silicon and the silicon compound and $D_{50}$ of particles of the carbon, wherein the particle size adjusting step adjusts the $D_{90}$ and the $D_{50}$ by an ultrafine powder air classification or a sieve classification.

According to an aspect of the present invention, a lithium ion secondary battery using a negative electrode active material containing silicon or a silicon compound and capable of achieving a high energy density by inhibiting the expansion of the negative electrode and the battery (the coefficient of expansion when the negative electrode is fully charged is 110% or more and 140% or less) and a manufacturing method thereof can be provided.

DESCRIPTION OF THE PREFERRED EMBODIMENTS

Lithium ion secondary batteries in relation with the present invention will be described in detail below. However, the technical scope of the present invention is not limited to the embodiments below.

[Basic Idea of the Present Invention]

According to the present invention, the particle size of each of silicon or a silicon compound and carbon is controlled to inhibit the expansion of the negative electrode containing silicon or the silicon compound and carbon. Hereinafter, the relationship between the particle size control of the negative electrode active material particles and the expansion inhibition of the negative electrode will be described in detail.

Figure 1:
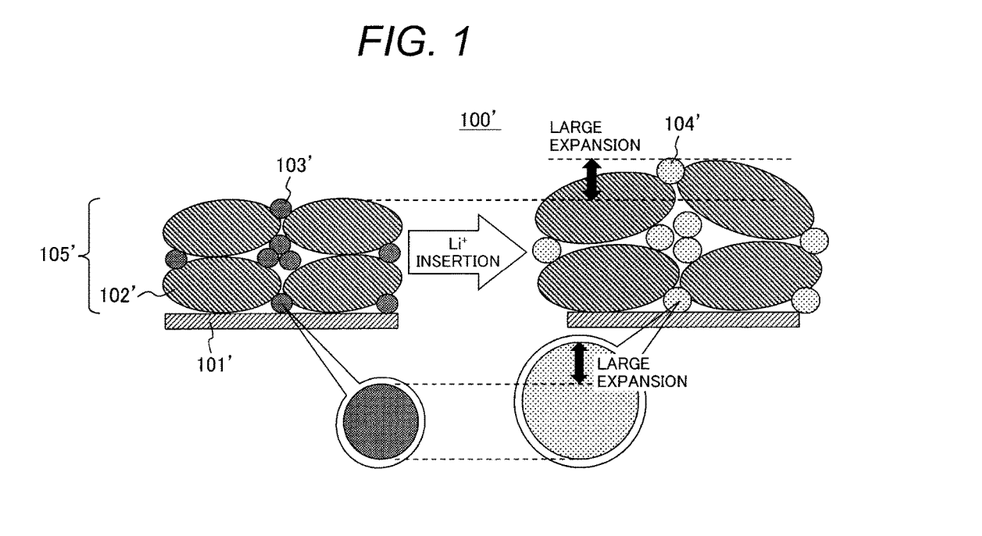
FIG. 1 is a sectional schematic diagram illustrating a negative electrode expansion mechanism in a conventional lithium ion secondary battery.

FIG. 1 is a sectional schematic diagram illustrating a negative electrode expansion mechanism in a conventional lithium ion secondary battery. As illustrated in FIG. 1, a negative electrode 100' has a negative electrode mixture layer 105' on the surface of current collector foil 101' and the negative electrode mixture layer 105' has carbon particles 102' (for example, the average particle size is 25 μm) and Si particles 103' (for example, the average particle size is 10 μm) as negative electrode active materials. When lithium ions ($Li^+$) are inserted into the Si particles 103' while the lithium ion secondary battery is charged, the Si particles 103' form $Li_{3.75}Si$ (Li—Si) 104', expanding the volume about four times before the charge. Due to expansion of the Si particles 103', the negative electrode mixture layer 105' also expands.

Thus, the present invention inhibits the expansion of the negative electrode by (i) making the particle size of Si smaller, (ii) making the particle size of carbon smaller, and (iii) making the particle sizes of Si and carbon smaller. Hereinafter, (i) will be described using FIG. 2A, (ii) will be described using FIG. 2B, and (iii) will be described using FIG. 2C.

Figure 2A:
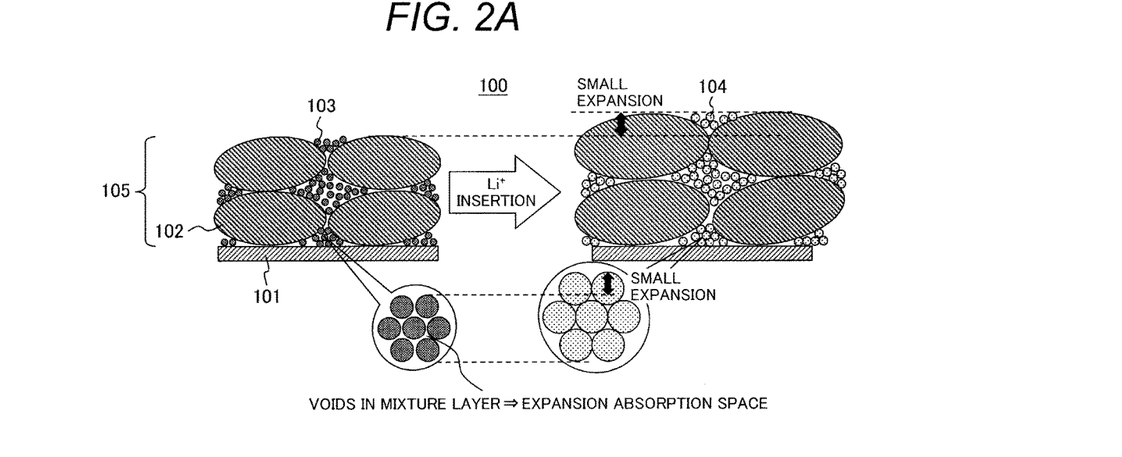
FIG. 2A is a sectional schematic diagram illustrating a first example (smaller particle size Si applied) of a negative electrode expansion inhibition mechanism in a lithium ion secondary battery according to the present invention.

FIG. 2A is a sectional schematic diagram illustrating a first example (smaller particle size Si applied) of a negative electrode expansion inhibition mechanism in a lithium ion secondary battery according to the present invention. As shown in FIG. 2A, voids in a negative electrode mixture layer 105 are increased by making the particle size of Si particles 103 smaller (removing coarse Si particles) (for example, $D_{90}$ of Si is 2.2 μm). Thus, even if the Si particles 103 expand, voids become an expansion absorption space so that the expansion can be minimized in the negative electrode mixture layer 105 as a whole.

Figure 2B:
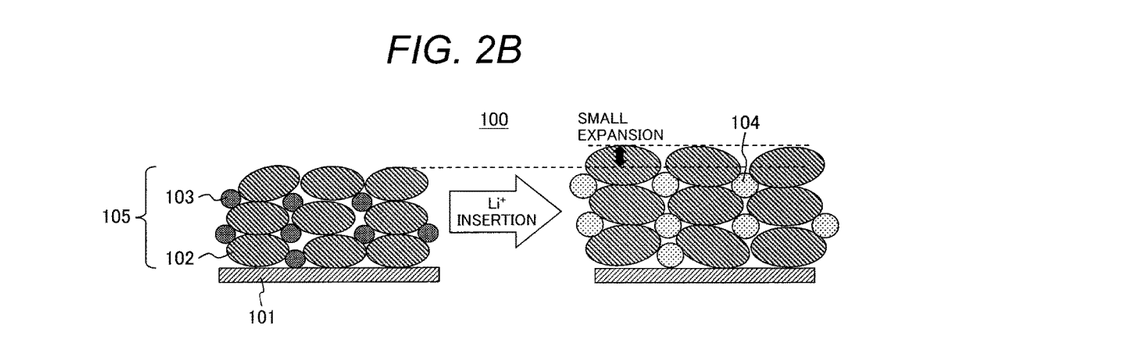
FIG. 2B is a sectional schematic diagram illustrating a second example (smaller particle size carbon applied) of the negative electrode expansion inhibition mechanism in the lithium ion secondary battery according to the present invention.

FIG. 2B is a sectional schematic diagram illustrating a second example (smaller particle size carbon applied) of the negative electrode expansion inhibition mechanism in the lithium ion secondary battery according to the present invention. As shown in FIG. 2B, by making the particle size of carbon whose ratio in the negative electrode mixture layer 105 is high smaller (for example, $D_{50}$ of carbon is 12.0 μm), dispersibility of the Si particles 103 is improved and the expansion of Si particles can be dispersed over the entire electrode without Si particles expanding against each other so that the expansion can be minimized in the negative electrode mixture layer 105 as a whole.

Figure 2C:
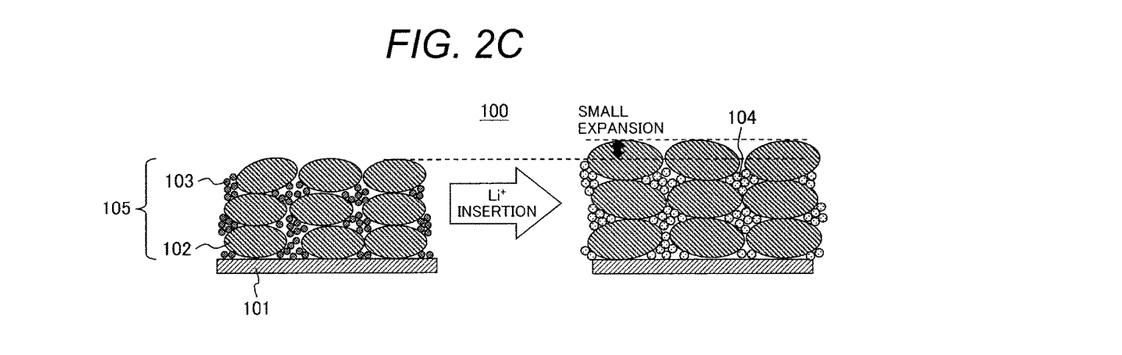
FIG. 2C is a sectional schematic diagram illustrating a third example (smaller particle size Si and smaller particle size carbon applied) of the negative electrode expansion inhibition mechanism in the lithium ion secondary battery according to the present invention.

FIG. 2C is a sectional schematic diagram illustrating a third example (smaller particle size Si and smaller particle size carbon applied) of the negative electrode expansion inhibition mechanism in the lithium ion secondary battery according to the present invention. In FIG. 2C, by making the particle sizes of both of the Si particles 103 and carbon particles 102 smaller, the expansion of the negative electrode mixture layer 105 as a whole can be inhibited by combining the effects of (i) and (ii).

The expansion in the width direction and the thickness direction of the negative electrode can be inhibited by (i) to (iii) described above. To achieve the above effects, it is necessary to, in addition to controlling the particle size of each of the Si particles 103 and the carbon particles 102, control the weight mixing ratio of the Si particles 103 and the carbon particles 102. A lithium ion secondary battery according to the present invention will be described in detail below.

[Lithium Ion Secondary Battery]

<Negative Electrode>

A lithium ion secondary battery according to the present invention uses silicon (pure Si) or a silicon compound (containing a Si alloy (for example, Si—Ti—Fe, Si—Fe, Si—Al—Ni, Si—Al, Si—Cu, Si—Ti, or Si—Mn alloy) and silicon oxide ($SiO_x$ (x is independent of $D_{90}$ of particles of at least one of silicon and the silicon compound)) and carbon (including artificial graphite and natural graphite) as a negative electrode active material of a negative electrode capable of occluding and releasing lithium ions. The Si alloy may contain other metal elements than titanium (Ti), iron (Fe), aluminum (Al), nickel (Ni), copper (Cu), and manganese (Mn) described above. In the present invention, "silicon" includes pure Si and the "silicon compound" includes Si alloy and silicon oxide ($SiO_x$).

The Si alloy is normally in a state in which fine particles of the metal Si are dispersed in each particle of other metal elements or other metal elements are dispersed in each particle of Si. An Si alloy is produced by mechanical synthesis using the mechanical alloy method or heating and cooling a mixture of Si particles and other metal elements. The composition of the Si alloy desirably has an addition quantity of 50 at % or more and 90 at % or less (the atomic percentage (at %) of Si and other metal elements is 50:50 to 90:10) and more desirably 60 at % or more and 80 at % or less. If the addition quantity of Si is less than 50 at %, a sufficient energy density cannot be achieved. If the addition quantity of Si is more than 90 at %, the expansion of the negative electrode becomes too excessive. Concrete examples of the Si alloy include $Si_{70}Ti_{10}Fe_{10}Al_{10}$, $Si_{70}Al_{30}$, $Si_{70}Ni_{30}$, $Si_{70}Cu_{30}$, $Si_{70}Fe_{30}$, $Si_{70}Ti_{30}$, $Si_{70}Mn_{30}$, $Si_{70}Ti_{15}Fe_{15}$, and $Si_{70}Al_{10}Ni_{20}$.

Carbon (C) is not particularly limited in material and artificial graphite and natural graphite can be used. The weight mixing ratio of Si or a Si compound and carbon is preferably 20:80 to 50:50. If the mixed weight of Si or the Si compound is less than 20% by weight, a sufficient energy density cannot be achieved. If the mixed weight of Si or the Si compound is more than 80% by weight, the expansion of the negative electrode becomes too excessive.

In the present invention, when the $D_{90}$ of the Si or the Si compound is x, the $D_{50}$ of the carbon is y, and a weight mixing ratio of the carbon to at least one of the silicon and the silicon compound is z, the x and the y are adjusted in the particle size such that the x, the y, and the z satisfy $y \leq -1.17x+0.45z$, the x is 2 μm or more and 10 μm or less, the y is 10 μm or more and 23 μm or less, and the z is 50% by weight or more and 80% by weight or less. As described above, the expansion of the negative electrode can effectively be inhibited by controlling x, y, and z of Si or the Si compound described above. In the present invention, "$D_{90}$" means the particle size of the 90th particle size when 100 particles are arranged in ascending order of particle size and "$D_{50}$" means the particle size of the 50th particle size (average particle size) when 100 particles are arranged in ascending order of particle size.

Next, the negative electrode containing the negative electrode active material will be described. The negative electrode has current collector foil (copper foil, stainless foil or the like) as a negative electrode current collector and is constructed by forming a coated layer (negative electrode mixture layer) of a negative electrode active material mixture containing the above negative electrode active material on both sides of the current collector foil. The negative electrode active material mixture is obtained by adding a binder and a conductive assistant to Si particles and carbon particles of the negative electrode active material and dispersing the mixture in a solvent. The viscosity of the negative electrode active material mixture can be adjusted by adjusting the amount of solvent. The binder, conductive assistant, and solvent are not particularly limited and publicly known materials can be used. For example, a binder containing at least one of polyimide, polyamide-imide, and polyamide can be used as the binder, acetylene black can be used as the conductive assistant, and NMP (N-metyl-2-pyrolidone) can be used as the solvent.

The coating amount of the negative electrode active material mixture on the negative electrode current collector is adjusted such that the capacity of the positive electrode and that of the negative electrode becomes equal. After the coated layer coated on the surface of the negative electrode current collector is dried, the coated layer is preferably roll-pressed by a roll-press machine such that the density of the negative electrode mixture layer is 2.2 $g/cm^3$. The percentage of voids of the negative electrode mixture layer is preferably 10% to 40% and more desirably, 15% to 35%. If the percentage of voids is less than 10%, it becomes difficult to inhibit the expansion and if the percentage of voids is more than 40%, a sufficient energy density cannot be obtained. The percentage of voids of the negative electrode mixture layer can be obtained by the following formula:

$$\{100-(\text{electrode density (g/cm))/average density of the negative electrode mixture (g/cm))}\} \times 100$$

The electrode density can be determined from the thickness and weight of the electrode.

After the coating, the solvent is dried for curing. If, for example, NMP is used as the solvent, the solvent can be dried at 250° C. A negative electrode can be produced by following the above step.

<Positive Electrode>

The configuration of a positive electrode is not particularly limited and a publicly known technology can be applied. Any material capable of occluding and releasing lithium ions can be used as a positive electrode active material and a material commonly used for a nonaqueous secondary battery can be used. For example, $LiNi_{1/3}Mn_{1/3}Co_{1/3}O_2$ is preferable. The positive electrode constituting an electrode group preferably uses aluminum foil as the positive electrode current collector foil. A coated layer (positive electrode mixture layer) of a positive electrode active material mixture containing the above positive electrode active material is formed on both sides of the aluminum foil. The positive electrode active material mixture contain, in addition to the positive electrode active material, a conductive assistant and a binder. The conductive assistant and the binder are not particularly limited and it is preferable to use, for example, a carbon material (acetylene black) as the conductive assistant and polyvinylidene fluoride (hereinafter, abbreviated as PVDF) as the binder. The viscosity of the positive electrode active material mixture can be adjusted by adjusting the amount of solvent. The positive electrode active material, conductive assistant, and binder are preferably mixed in the weight mixing ratio of 90:5:5.

After the coated layer coated on the surface of the positive electrode current collector is dried, the coated layer is preferably roll-pressed by a roll-press machine such that the density of the positive electrode mixture layer is 2.8 $g/cm^3$. In addition, the coating amount of the positive electrode active material mixture is preferably 240 $g/m^2$.

<Separator>

A separator is used for separating (segregating) the positive electrode and the negative electrode. The separator is preferably formed from a material that blocks the movement of lithium ions by thermal contraction when the lithium ion secondary battery heats up for some reason. For example, polyolefine can be used as the separator. Polyolefine is a chain polymeric material typically including polyethylene and polypropylene.

As other materials of the separator, polyolefine containing heat-resistant resin such as polyamide, polyamide-imide, polyimide, polysulfone, polyether sulfone, polyphenyl sulfone, and polyacrylonitrile may be used. An inorganic filler layer may be formed on one side or on both sides of separator. An inorganic filler layer formed from a material containing at least one of $SiO_2$, aluminum oxide ($Al_2O_3$), montmorillonite, mica, zinc oxide (ZnO), titanium oxide ($TiO_2$), barium titanate ($BaTiO_3$), and zirconium oxide ($ZrO_2$) may be used. From the viewpoint of the cost and performance, $SiO_2$ or $Al_2O_3$ is preferably used for the inorganic filler layer.

<Electrolytic Solution>

The material of an electrolytic solution is not particularly limited and, for example, a solution of 1 M obtained by dissolving an electrolyte of lithium hexafluorophosphate ($LiPF_6$) in a solvent containing ethylene carbonate (EC), ethylmethyl carbonate (EMC), and dimethyl carbonate (DMC) in a volume percentage of EC:EMC:DMC=28:36:36 can be used. In addition, at least one nonaqueous solvent selected from, for example, ethylene carbonate, propylene carbonate, butylene carbonate, dimethyl carbonate, ethylmethyl carbonate, diethyl carbonate, γ-butyrolactone, γ-valerolactone, methyl acetate, ethyl acetate, methyl propionate, tetrahydrofuran, 2-methyltetrahydrofuran, 1,2-dimethoxy ethane, 1-ethoxy-2-methoxyethane, 3-methyltetrahydrofuran, 1,2-dioxane, 1,3-dioxane, 1,4-dioxane, 1,3-dioxolane, 2-methyl-1,3-dioxolane, and 4-methyl-1,3-dioxolane can be used. In addition to $LiPF_6$, lithium salt such as $LiBF_4$, $LiClO_4$, and $LiN(C_2F_5SO_2)_2$ or known electrolytes used in a lithium ion secondary battery such as solid electrolytes, gel electrolytes, and molten salt having conductivity of lithium ions can be used as the electrolyte.

Figure 3:
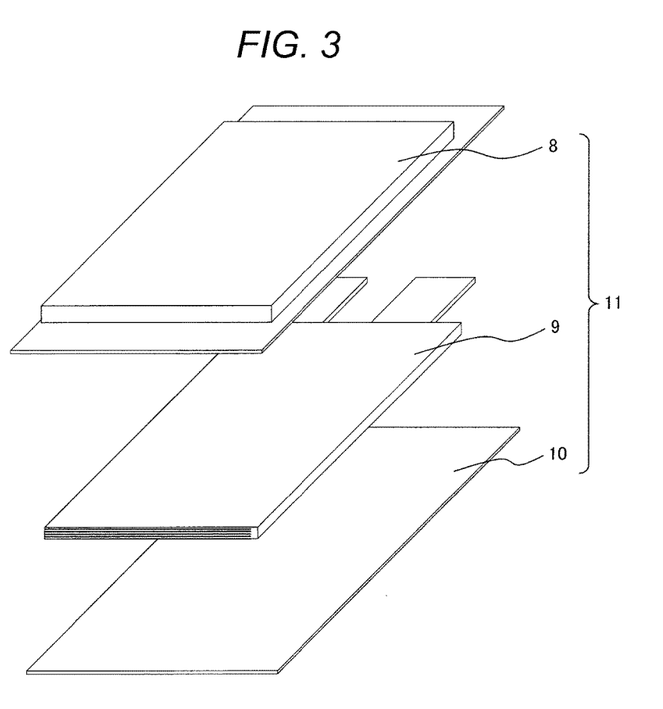
FIG. 3 is an exploded perspective view schematically showing a laminated cell.

The procedure for producing a lithium ion secondary battery (laminated cell) using the aforementioned negative electrode, positive electrode, separator, and electrolytic solution will be described. FIG. 3 is an exploded perspective view schematically showing a laminated cell. As shown in FIG. 3, a laminated cell 11 is produced by sandwiching a stacked electrode group 9 between laminated films 8, 10 and then edges of the laminated films 8, 10 are brought into contact with each other and thermally welded for sealing at 175° C. for 10 seconds. To provide an injection mouth to inject an electrolytic solution into the laminated cell when sealing the laminated films, three sides excluding one side where the injection mouth is provided are thermally welded and the electrolytic solution is injected into the laminated cell through the injection mouth and then, the one side is thermally welded for sealing while being vacuum air-pressed. The one side used for the injection mouth is adjusted to have less thermal welding strength than the other three sides. This is intended to impart an effect of a gas exhaust valve when a gas arises in the laminated cell with charge and discharge cycles. In addition to the above, a thin portion may be provided in a portion of the laminated film 8 as a means for exhausting a gas to exhaust the gas from the thin portion.

Figure 4:
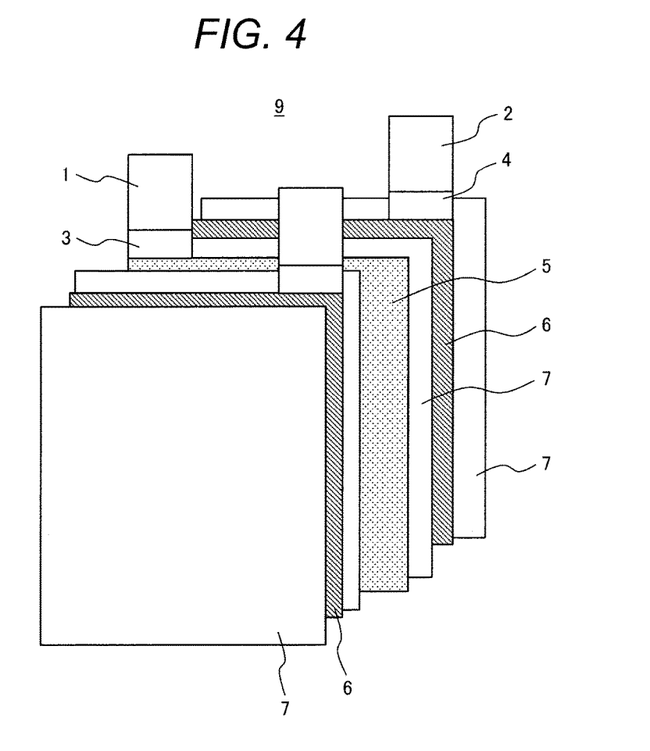
FIG. 4 is an exploded perspective view schematically showing a stacked electrode group inside the laminated cell.

FIG. 4 is an exploded perspective view schematically showing a stacked electrode group inside the laminated cell. As shown in FIG. 4, the stacked electrode group 9 has a configuration in which a plurality of plate positive electrodes 5 and a plurality of plate negative electrodes 6 are stacked by being separated by a plurality of plate separators 7. The composition of the positive electrode active material of the plurality of positive electrodes constituting one stacked electrode group is the same. Similarly, the composition of the negative electrode active material of the plurality of negative electrodes constituting one stacked electrode group is the same.

Positive electrode uncoated portions 3 of the plurality of positive electrodes 5 constituting the stacked electrode group 9 are bundled and ultrasonic-welded to a positive electrode terminal 1. Also, negative electrode uncoated portions 4 of the plurality of negative electrodes 6 are bundled and ultrasonic-welded. The welding of electrodes is not limited to ultrasonic welding and resistance welding or the like may also be used. To make sealing of a lithium ion secondary battery more reliable, a thermal welding resin may be applied to sealing locations of the positive electrode terminal 1 and a negative electrode terminal 2 or mounted thereon in advance. A laminated cell type lithium ion secondary battery can be produced by, as described above, housing the stacked electrode group in the laminated films.

[Manufacturing Method of a Lithium Ion Secondary Battery]

According to the present invention, as described above, the expansion of the negative electrode is inhibited by adjusting $D_{90}$ of particles of silicon or a silicon compound and $D_{50}$ of particles of carbon. The manufacturing method of a lithium ion secondary battery according to the present invention includes a particle size adjusting step. In the particle size adjusting step, $D_{90}$ of particles of at least one of silicon or a silicon compound and $D_{50}$ of carbon are adjusted by the ultrafine powder air classification or the sieve classification. The sieve classification may be manual or automatic. The particle size ($D_{90}$) of silicon or the silicon compound and the particle size ($D_{50}$) of carbon can be adjusted to predetermined values by adjusting the air quantity, the number of revolutions of a rotor and the like in the ultrafine powder air classification and by adjusting the size of mesh in the sieve classification.

EXAMPLES

<Production and Evaluation Results of Lithium Ion Secondary Batteries in Examples 1 to 16 and Comparative Examples 1 to 6>

Lithium ion secondary batteries shown in FIGS. 3 and 4 are produced to evaluate the coefficient of expansion of the single electrode (negative electrode) and the coefficient of expansion of batteries. A Si alloy is used as the Si compound and graphite (artificial graphite) is used as carbon in the negative electrode active material. The composition of the Si alloy, the weight mixing ratio of the Si alloy and graphite, $D_{50}$ and $D_{90}$ of Si alloy particles, and $D_{50}$ of graphite particles are shown in Table 1 below. $D_{50}$ and $D_{90}$ of Si alloy particles and $D_{50}$ of graphite particles are adjusted by the ultrafine powder air classification. The particle size distribution of the Si alloy and graphite is measured by using a laser diffraction/scattering particle size distribution measuring apparatus. $D_{50}$ of Si alloy particles is not limited to the present invention, but is shown for reference.

After preparing a negative electrode active material mixture by adding a binder (polyamide-imide), a conductive assistant (acetylene black), and a solvent (NMP) to the negative electrode active material, the current collector foil (copper foil) is coated therewith and dried and then, roll-pressed by a roll-press machine such that the density of the negative electrode active material mixture layer is 2.2 g/cm³.

$LiNi_{1/3}Mn_{1/3}Co_{1/3}O_2$ is used as the positive electrode active material and after a binder (PVDF), a conductive assistant (acetylene black), and a solvent (NMP) are added to the positive electrode active material to prepare a positive electrode active material mixture, the current collector foil (aluminum foil) is coated therewith and dried and then, roll-pressed by a roll-press machine such that the density of the positive electrode active material mixture layer is 2.8 g/cm$^3$, and dried at 250° C.

A composite material of polyethylene and polypropylene is used as the separator. A solution of 1 M obtained by dissolving LiPF$_6$ in a solvent containing EC, EMC, and DMC in a volume percentage of EC:EMC:DMC=28:36:36 is used as the electrolytic solution.

<Evaluation of the Coefficient of Expansion of the Single Electrode>

The coefficient of expansion of the single electrode is determined as described below for the negative electrodes of Examples 1 to 16 and Comparative Examples 1 to 6. The produced negative electrode is punched in diameter of 16 mm to produce a model cell of about 8 mAh class. A Li metal is used for a counter electrode. The model cell is charged at constant voltage and constant current for 12 hours using the potential 5 mV, the current 0.1 CA, and the cutoff current 0.05 mA and discharged at constant current using the potential 1.5 V and the current 0.1 CA. The above operation is repeated 10 times and then, the model cell is charged similarly to produce a single electrode of 100% SOC (State Of Charge). Then, after performing cross-sectional processing in a direction perpendicular to the copper foil under the condition of non-exposure to the atmosphere, an SEM observation is made. Three or more fields of view selected randomly are observed, the thickness of the electrode is measured, and the average value thereof is determined and set as the thickness of the electrode (negative electrode) of 100% SOC. The coefficient of expansion of the single electrode is calculated by dividing the thickness of the electrode of 100% SOC by the thickness of the electrode after the creation (unused electrode). Evaluation results are also listed in Table 1.

<Evaluation of the Coefficient of Expansion of Batteries>

The coefficient of expansion of cells is determined is determined as described below for lithium ion secondary batteries in Examples 1 to 16 and Comparative Examples 1 to 6. The produced lithium ion secondary battery is used to charge at constant voltage and constant current for 22 hours using the voltage 4.2 V and the current 0.05 CA and discharged at constant current using the voltage 2.0 V and the current 0.05 CA. The above operation is repeated 100 times and then, the lithium ion secondary battery is charged similarly to produce a lithium ion secondary battery of 100% SOC (State Of Charge). Then, the thickness at three locations or more is measured and the average value thereof is set as the cell thickness of 100% SOC. The coefficient of expansion of the battery is calculated by dividing the cell thickness of 100% SOC by the cell thickness after the creation (unused cell). Evaluation results are also listed in Table 1. Also, the coefficient of expansion of the single electrode of the battery and the coefficient of expansion of the battery when only graphite (artificial graphite) is used as the negative electrode active material are listed in Table 1.

TABLE 1

Negative electrode active materials and evaluation results of Examples 1 to 16 and Comparative Examples 1 to 6

| | Negative electrode active material | | | | Evaluation result | |
| --- | --- | --- | --- | --- | --- | --- |
| | Si alloy | Weight mixing ratio of Si alloy and graphite | Si alloy $D_{50}$ (μM) | Si alloy $D_{90}$ (μM) | Graphite $D_{50}$ (μm) | Coefficient of expansion of single electrode (%) | Coefficient of expansion of battery (%) |
| Examples 1 | $Si_{70}Ti_{15}Fe_{15}$ | 50:50 | 1.1 | 2.2 | 12 | 128 | 108 |
| Examples 2 | $Si_{70}Ti_{15}Fe_{15}$ | 50:50 | 3.6 | 8.4 | 12 | 136 | 110 |
| Examples 3 | $Si_{70}Ti_{15}Fe_{15}$ | 50:50 | 1.1 | 2.2 | 18.7 | 137 | 110 |
| Examples 4 | $Si_{70}Ti_{15}Fe_{15}$ | 30:70 | 1.1 | 2.2 | 12 | 120 | 107 |
| Examples 5 | $Si_{70}Ti_{15}Fe_{15}$ | 30:70 | 3.6 | 8.4 | 12 | 123 | 109 |
| Examples 6 | $Si_{70}Ti_{15}Fe_{15}$ | 30:70 | 3.6 | 8.4 | 18.7 | 125 | 112 |
| Examples 7 | $Si_{70}Ti_{15}Fe_{15}$ | 30:70 | 1.1 | 2.2 | 22.5 | 124 | 111 |
| Examples 8 | $Si_{70}Fe_{30}$ | 50:50 | 1.3 | 2.8 | 12 | 130 | 108 |
| Examples 9 | $Si_{70}Fe_{30}$ | 50:50 | 4 | 8.5 | 12 | 137 | 110 |
| Examples 10 | $Si_{70}Fe_{30}$ | 50:50 | 1.3 | 2.8 | 18.7 | 139 | 110 |
| Examples 11 | $Si_{70}Al_{10}Ni_{20}$ | 50:50 | 1.3 | 2.7 | 12 | 130 | 112 |
| Examples 12 | $Si_{70}Al_{30}$ | 50:50 | 1.5 | 2.9 | 12 | 131 | 110 |
| Examples 13 | $Si_{70}Ni_{30}$ | 50:50 | 1.2 | 2.5 | 12 | 128 | 109 |
| Examples 14 | $Si_{70}Cu_{30}$ | 50:50 | 1.2 | 2.7 | 12 | 128 | 109 |
| Examples 15 | $Si_{70}Ti_{30}$ | 50:50 | 1.4 | 2.8 | 12 | 130 | 112 |
| Examples 16 | $Si_{70}Mn_{30}$ | 50:50 | 1.2 | 2.4 | 12 | 129 | 110 |
| Comparative Examples 1 | $Si_{70}Ti_{15}Fe_{15}$ | 50:50 | 6.8 | 12.3 | 25.5 | 162 | 131 |
| Comparative Examples 2 | $Si_{70}Ti_{15}Fe_{15}$ | 50:50 | 3.6 | 8.4 | 25.5 | 158 | 125 |
| Comparative Examples 3 | $Si_{70}Ti_{15}Fe_{15}$ | 50:50 | 6.8 | 12.3 | 18.7 | 155 | 124 |
| Comparative Examples 4 | $Si_{70}Ti_{15}Fe_{15}$ | 30:70 | 6.8 | 12.3 | 25.5 | 148 | 128 |
| Comparative Examples 5 | $Si_{70}Ti_{15}Fe_{15}$ | 30:70 | 3.6 | 8.4 | 25.5 | 141 | 120 |
| Comparative Examples 6 | $Si_{70}Ti_{15}Fe_{15}$ | 30:70 | 6.8 | 12.3 | 18.7 | 142 | 119 |
| Graphite | — | — | — | — | 18.7 | 125 | 110 |

<Relationship Between the Particle Size Distribution and Coefficient of Expansion of the Si Alloy and Graphite>

Figure 5:
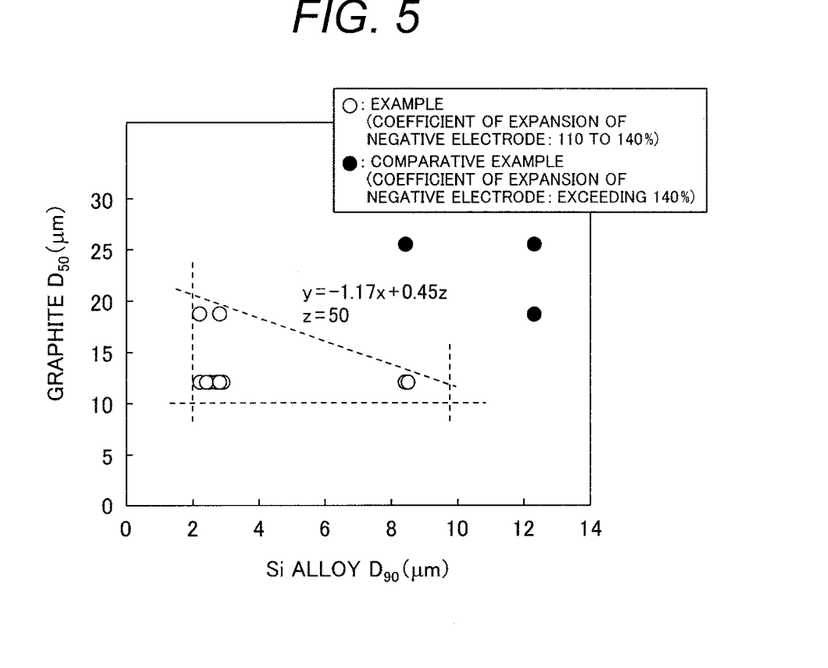
FIG. 5 is a graph showing the relationship between a particle size distribution of a negative electrode active material and a coefficient of expansion of a negative electrode of lithium ion secondary batteries of Examples 1 to 16 and Comparative Examples 1 to 6 (z=50)
Figure 6:
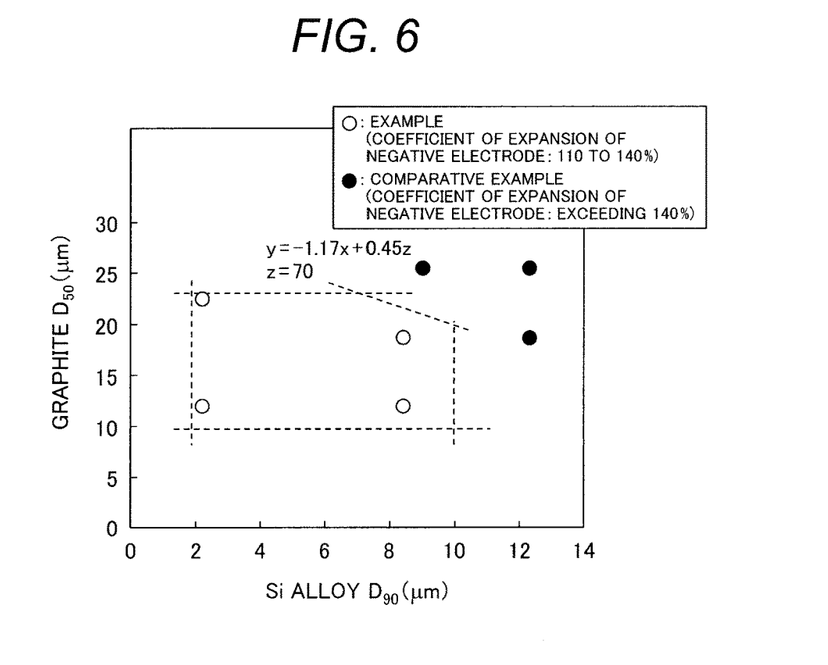
FIG. 6 is a graph showing the relationship between the particle size distribution of the negative electrode active material and the coefficient of expansion of the negative electrode of lithium ion secondary batteries of Examples 1 to 16 and Comparative Examples 1 to 6 (z=70)

FIGS. 5 and 6 are graphs showing the relationship between the particle size distribution of the negative electrode active material and the coefficient of expansion of the negative electrode for lithium ion secondary batteries in Examples 1 to 16 and Comparative Examples 1 to 6. FIG. 5 shows a case when Z=50 and FIG. 6 shows a case when Z=70. In FIGS. 5 and 6, an area inside a dotted line is an area where conditions of the present invention (y≤−1.17x+0.45z is satisfied, x is 2 μm or more and 10 μm or less, and y is 10 μm or more and 23 μm or less) are satisfied. As shown in Table 1, by adjusting the particle size of the Si alloy and graphite, Examples 1 to 16 can achieve 110% or more and 140% or less in coefficient of expansion of the single electrode and 112% or less in coefficient of expansion of the battery. The coefficient of expansion of the battery can be limited to a value (110%) equivalent to that when graphite is used alone and thus, the establishment of a usable battery can be said. On the other hand, the coefficients of expansion of the single electrode and the coefficients of expansion of the battery in Comparative Examples 1 to 6 are all larger than those of Examples 1 to 16. As shown in FIGS. 5 and 6, Examples 1 to 16 (white circle) are all inside the area satisfying the conditions of the present invention and Comparative Examples 1 to 6 (black circle) are outside the area.

In Example 2, small particle size graphite of 12.0 μm in $D_{50}$ is applied and due to the small particle size graphite, dispersibility of the Si alloy is improved and the expansion of the Si alloy can be dispersed over the entire electrode without expansion of Si alloys expanding against each other, which is considered to enable the coefficient of expansion of the battery to be reduced to 110%. In Example 3, coarse Si alloy particles are removed by the classification and a Si alloy of 2.2 μm in $D_{90}$ is applied and the coefficient of expansion of the battery is considered to be reduced to 110% by the expansion of small particle size Si alloys being absorbed by a micro-space formed by such Si alloys. In Example 1, both of coarse particle removed Si alloys and small particle size graphite are applied and the coefficient of expansion of the battery is further reduced to 108%. The above result is considered to result from both effects of the coarse particle removed Si alloys and small particle size graphite.

On the other hand, when compared with the lithium ion secondary batteries in Examples 1 to 3, the lithium ion secondary battery in Comparative Example 1 has larger $D_{90}$ of the Si alloy and $D_{50}$ of graphite, 12.3 μm and 25.5 μm respectively, which reveals a large coefficient of expansion of the battery of 131%. If $D_{90}$ of the Si alloy is large, the expansion is locally concentrated and if $D_{50}$ of graphite is large, dispersibility of the Si alloy deteriorates, which is considered to disable the inhibition of expansion. In Comparative Example 2, $D_{90}$ of the Si alloy is 8.4 μm within the range of 2 to 10 μm, but $D_{50}$ of graphite is 25.5 μm and if larger than 23 μm, dispersibility of the Si alloy deteriorates, which increases the coefficient of expansion of the battery to 125%. In Comparative Example 3, $D_{50}$ of graphite is 18.7 μm within the range of 10 to 23 μm, but $D_{90}$ of the Si alloy is outside the range, resulting in a large coefficient of expansion of the battery of 124%.

In Examples 4 to 7, the weight mixing ratio of the Si alloy and graphite is set to 30:70. In Example 4, like in Example 1, both effects of the coarse particle removed Si alloys and small particle size graphite show up and a low coefficient of expansion of the battery of 107% results. In Example 5, like in Example 2, small particle size graphite is applied, dispersibility of the Si alloy is improved, and the coefficient of expansion is 109%, which is equivalent to the coefficient of expansion of the battery using a graphite negative electrode. In Example 6, particles having $D_{90}$ of the Si alloy of 8.4 μm and $D_{50}$ of graphite of 18.7 μm are applied and the coefficient of expansion of the battery is 112%. It is clear that if the weight mixing ratio of the Si alloy and graphite is in the range of 20:80 to 50:50, the coefficient of expansion of the battery is equivalent to that of a battery using the graphite negative electrode. Further in Example 7, with $D_{50}$ of graphite of 22.5 μm and $D_{90}$ of the Si alloy of 2.2 μm, the coefficient of expansion of the battery can be reduced to 111%. On the other hand, as shown in Comparative Examples 4 to 6, even when the weight mixing ratio of graphite is 70%, if $D_{90}$ of the Si alloy is outside the range of 2 to 10 μm or $D_{50}$ of graphite is outside the range of 10 to 23 μm, the coefficient of expansion becomes equal to that (110%) when the graphite negative electrode is used or larger, leading to larger coefficients of expansion than those of Examples.

Examples 8 to 16 use different types of Si alloy and show that if the conditions of the present invention are satisfied, the coefficient of expansion of the battery can be made equivalent to that (110%) when the graphite negative electrode is used.

<Production and Evaluation Results of Lithium Ion Secondary Batteries in Examples 17 to 28 and Comparative Examples 7 to 15>

Lithium ion secondary batteries are produced in the same manner as in Examples 1 to 16 and Comparative Examples 1 to 6 except that, instead of the Si alloy, $SiO_x$ is used as a negative electrode active material and the coefficient of expansion of the single electrode (negative electrode) and the coefficient of expansion of the battery are evaluated. The weight mixing ratio of $SiO_x$ and graphite, $D_{50}$ and $D_{90}$ of $SiO_x$, $D_{50}$ of graphite, and evaluation results are listed in Table 2 below. $SiO_x$ is produced by undergoing (a) the step of mixing Si particles and $SiO_x$ particles, (b) the step of growing the Si crystal by flocculating $SiO_x$, (c) the step of grinding particles, and (d) the step of forming a $SiO_x$ film by oxidizing the particle surface of Si.

(a) Step of Mixing Si Particles and $SiO_x$ Particles

To produce particles in which Si is dispersed in $SiO_x$ particles, $SiO_x$ particles and Si particles are first mixed. A ball mill is used for mixing at 150 rpm.

(b) Step of Growing the Si Crystal by Flocculating $SiO_x$

A mixture of $SiO_x$ particles and Si particles is heated up to 1000° C. in an argon gas atmosphere and then held at the temperature for three hours to obtain particles in which a Si particle crystal is embedded in $SiO_x$ due to a disproportionation reaction.

(c) Step of Grinding Particles

Particles in which a Si crystal is grown by flocculating $SiO_x$ are treated by the ball mill at 500 rpm to grind particles to a predetermined particle size.

After $SiO_x$ is synthesized by the above procedure, $D_{50}$ and $D_{90}$ of $SiO_x$ are adjusted by using the ultrafine powder air classification.

TABLE 2

Negative electrode active materials and evaluation results of Examples 17 to 28 and Comparative Examples 7 to 15

| | Negative electrode active material | | | | Evaluation result | |
|---|---|---|---|---|---|---|
| | Weight mixing ratio of $SiO_x$ and graphite | $SiO_x$ $D_{50}$ (μm) | $SiO_x$ $D_{90}$ (μm) | Graphite $D_{50}$ (μm) | Coefficient of expansion of single electrode (%) | Coefficient of expansion of battery (%) |
| Examples 17 | 50:50 | 1.3 | 2.8 | 12 | 131 | 112 |
| Examples 18 | 50:50 | 4 | 8.8 | 12 | 137 | 114 |
| Examples 19 | 50:50 | 1.3 | 2.8 | 18.7 | 139 | 116 |
| Examples 20 | 30:70 | 1.3 | 2.8 | 12 | 121 | 108 |
| Examples 21 | 30:70 | 4 | 8.8 | 12 | 122 | 108 |
| Examples 22 | 30:70 | 4 | 8.8 | 18.7 | 128 | 111 |
| Examples 23 | 30:70 | 1.3 | 2.8 | 22.5 | 132 | 114 |
| Examples 24 | 20:80 | 1.3 | 2.8 | 12 | 117 | 107 |
| Examples 25 | 20:80 | 4 | 8.8 | 12 | 118 | 109 |
| Examples 26 | 20:80 | 1.3 | 2.8 | 18.7 | 119 | 109 |
| Examples 27 | 20:80 | 1.3 | 2.8 | 22.5 | 125 | 111 |
| Examples 28 | 20:80 | 4 | 8.8 | 22.5 | 129 | 114 |
| Comparative Examples 7 | 50:50 | 6.2 | 12.5 | 25.5 | 166 | 134 |
| Comparative Examples 8 | 50:50 | 4 | 8.8 | 25.5 | 161 | 130 |
| Comparative Examples 9 | 50:50 | 6.2 | 12.5 | 18.7 | 155 | 129 |
| Comparative Examples 10 | 30:70 | 6.2 | 12.5 | 25.5 | 151 | 128 |
| Comparative Examples 11 | 30:70 | 4 | 8.8 | 25.5 | 141 | 122 |
| Comparative Examples 12 | 30:70 | 6.2 | 12.5 | 18.7 | 141 | 121 |
| Comparative Examples 13 | 20:80 | 6.2 | 12.5 | 25.5 | 143 | 125 |
| Comparative Examples 14 | 20:80 | 4 | 8.8 | 25.5 | 142 | 120 |
| Comparative Examples 15 | 20:80 | 6.2 | 12.5 | 18.7 | 141 | 120 |

Figure 7:
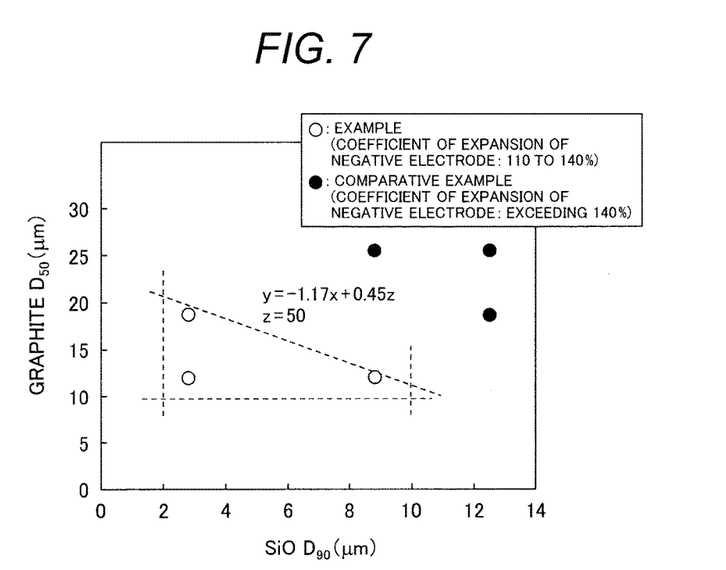
FIG. 7 is a graph showing the relationship between the particle size distribution of the negative electrode active material and the coefficient of expansion of the negative electrode of lithium ion secondary batteries of Examples 17 to 28 and Comparative Examples 7 to 15 (z=50)
Figure 8:
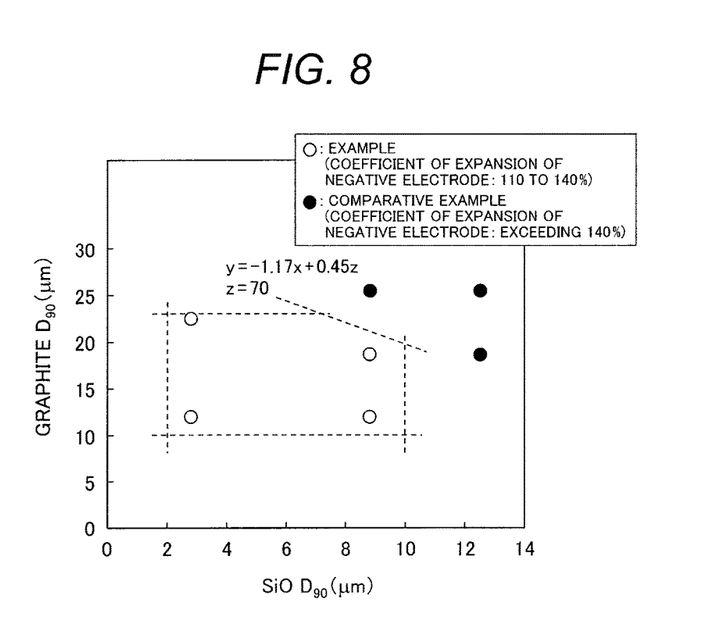
FIG. 8 is a graph showing the relationship between the particle size distribution of the negative electrode active material and the coefficient of expansion of the negative electrode of lithium ion secondary batteries of Examples 17 to 28 and Comparative Examples 7 to 15 (z=70)
Figure 9:
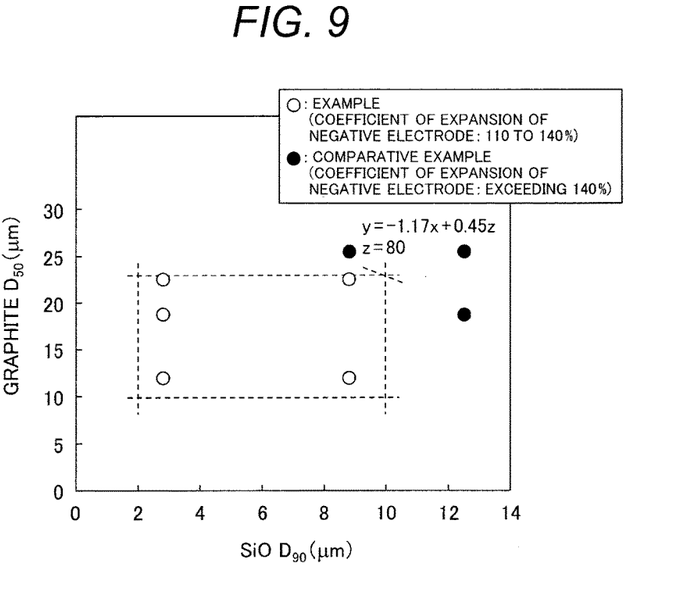
FIG. 9 is a graph showing the relationship between the particle size distribution of the negative electrode active material and the coefficient of expansion of the negative electrode of lithium ion secondary batteries of Examples 17 to 28 and Comparative Examples 7 to 15 (z=80).

FIGS. 7 to 9 are graphs showing the relationship between the particle size distribution of the negative electrode active material and the coefficient of expansion of the negative electrode for lithium ion secondary batteries in Examples 17 to 28 and Comparative Examples 7 to 15. In FIGS. 7 to 9, an area inside a dotted line is an area where the conditions of the present invention ($y \leq -1.17x+0.45z$ is satisfied, x is 2 μm or more and 10 μm or less, and y is 10 μm or more and 23 μm or less) are satisfied. As shown in Table 2, like the case of the Si alloy, by adjusting the particle size of $SiO_x$ and graphite, Examples 17 to 28 can achieve 110% or more and 140% or less in coefficient of expansion of the single electrode and 116% or less in coefficient of expansion of the battery. The coefficient of expansion of the battery can be limited to a value (110%) equivalent to that when graphite is used alone and thus, the establishment of a usable battery can be said. On the other hand, the coefficients of expansion of the single electrode and the coefficients of expansion of the battery in Comparative Examples 7 to 15 are all larger than those of Examples 17 to 28. As shown in FIGS. 7 to 9, Examples 17 to 28 (white circle) are all inside the area satisfying the conditions of the present invention and Comparative Examples 7 to 15 are outside the area.

According to the present invention, as described above, being able to provide a lithium ion secondary battery using a negative electrode active material containing silicon or a silicon compound and capable of achieving a high energy density by inhibiting the expansion of the battery (the coefficient of expansion when the negative electrode is fully charged is 110% or more and 140% or less) and a manufacturing method thereof has been demonstrated.

The present invention is not limited to the above examples and includes various modifications. For example, the above examples have been described in detail so that the present invention can be understood easily and the present invention is not necessarily limited to examples including all described structural elements. A portion of elements of some example may be replaced with elements of another example. Alternatively, elements of some example may be added to elements of another example. Alternatively, other elements may be added, deleted, or substituted for a portion of elements of each example.

What is claimed is:

1. A lithium ion secondary battery having a positive electrode capable of occluding and releasing lithium, a negative electrode capable of occluding and releasing the lithium, a separator separating the positive electrode and the negative electrode, and an electrolyte, wherein
the negative electrode includes a negative electrode active material containing at least one of two materials of silicon and a silicon compound and carbon,
a weight mixing ratio of at least one of two materials of the silicon and the silicon compound and the carbon is 20:80 to 50:50,
when $D_{90}$ of particles of at least one of the silicon and the silicon compound is x, $D_{50}$ of particles of the carbon is y, and the weight mixing ratio of the carbon is z, the x, the y, and the z satisfy $y \leq -1.17x+0.45z$, the x is 2 μm or more and 10 μm or less, the y is 10 μm or more and 23 μm or less, and the z is 50% by weight or more and 80% by weight or less, and a coefficient of expansion when the negative electrode is fully charged is 110% or more and 140% or less, and wherein the negative electrode includes a negative electrode mixture layer containing the negative electrode active material and a percentage of voids of the negative electrode mixture layer is 15% or more and no more than 35%.

2. The lithium ion secondary battery according to claim 1, wherein the silicon compound is a silicon alloy and an additional quantity of the silicon in the silicon alloy is 50 at % or more and 90 at % or less.

3. The lithium ion secondary battery according to claim 1, wherein the silicon compound is silicon oxide.

4. The lithium ion secondary battery according to claim 1, wherein the negative electrode is produced by forming the negative electrode mixture layer on a surface of current collector foil and the current collector foil is made of copper foil or stainless foil.

5. The lithium ion secondary battery according to claim 1, wherein the negative electrode mixture layer contains a binder and the binder contains at least one of polyimide, polyamide-imide, and polyamide.

* * * * *